United States Patent
Eide et al.

(10) Patent No.: US 9,886,083 B2
(45) Date of Patent: Feb. 6, 2018

(54) EVENT-DRIVEN REOPTIMIZATION OF LOGICALLY-PARTITIONED ENVIRONMENT FOR POWER MANAGEMENT

(71) Applicant: International Business Machines Corporation, Armonk, NY (US)

(72) Inventors: Curtis S. Eide, Rochester, MN (US); Aditya Kumar, Austin, TX (US); Kevin Wendzel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 14/576,370

(22) Filed: Dec. 19, 2014

(65) Prior Publication Data
US 2016/0179185 A1 Jun. 23, 2016

(51) Int. Cl.
*G06F 1/26* (2006.01)
*G06F 1/32* (2006.01)
(Continued)

(52) U.S. Cl.
CPC .............. *G06F 1/3296* (2013.01); *G06F 1/28* (2013.01); *G06F 1/3206* (2013.01); *G06F 1/329* (2013.01); *G06F 1/3293* (2013.01); *G06F 9/5077* (2013.01); *Y02B 60/121* (2013.01); *Y02B 60/142* (2013.01); *Y02B 60/144* (2013.01); *Y02B 60/167* (2013.01)

(58) Field of Classification Search
CPC ........ G06F 1/3296; G06F 1/28; G06F 1/3206; G06F 1/329; G06F 1/3293; G06F 9/5077; G06F 1/32

USPC ....................................................... 713/320
See application file for complete search history.

(56) References Cited

U.S. PATENT DOCUMENTS

| 8,402,259 B2 | 3/2013 | Sainath |
| 8,745,237 B2 | 6/2014 | Tsirkin et al. |

(Continued)

FOREIGN PATENT DOCUMENTS

| CN | 1719415 A | 1/2006 |
| CN | 101470634 A | 7/2009 |

(Continued)

OTHER PUBLICATIONS

International Search Report and the Written Opinion of the International Searching Authority, or the Declaration for Application No. PCT/IB2015/059280, dated Mar. 14, 2016.

(Continued)

*Primary Examiner* — Nitin Patel
(74) *Attorney, Agent, or Firm* — Middleton Reutlinger (57) ABSTRACT

The invention addresses these and other problems associated with the prior art by providing an apparatus and program product that utilize event-driven reoptimization to reallocate one or more logical partitions within a pool of logically-partitioned data processing systems in response to detection of a system event that is likely to increase or decrease the collective resource demands of logical partitions resident in a logically-partitioned computing environment. In some instances, for example, the reoptimization may be used to consolidate logical partitions on fewer processor nodes to improve the potential for powering down hardware resources and thereby reduce power consumption.

19 Claims, 7 Drawing Sheets

(51) Int. Cl.
*G06F 1/28* (2006.01)
*G06F 9/50* (2006.01)

(56) References Cited

U.S. PATENT DOCUMENTS

| | | |
|---|---|---|
| 9,262,799 B2 | 2/2016 | Liao |
| 2002/0129127 A1 | 9/2002 | Romero |
| 2004/0143664 A1 | 7/2004 | Usa et al. |
| 2006/0161417 A1* | 7/2006 | Hardwick ............ G06F 9/5011 703/22 |
| 2007/0294689 A1 | 12/2007 | Garney |
| 2009/0319705 A1 | 12/2009 | Foong et al. |
| 2010/0070784 A1* | 3/2010 | Gupta .................. G06F 1/3203 713/310 |
| 2011/0010709 A1 | 1/2011 | Anand |
| 2012/0284484 A1 | 11/2012 | Abdul et al. |
| 2013/0198468 A1* | 8/2013 | Antony .............. G06F 11/3442 711/162 |
| 2014/0007124 A1 | 1/2014 | Ashok et al. |
| 2014/0237475 A1* | 8/2014 | Jong .................... G06F 1/3206 718/102 |
| 2014/0344504 A1 | 11/2014 | Luo et al. |
| 2015/0051942 A1 | 2/2015 | Franco et al. |
| 2015/0058844 A1 | 2/2015 | Conklin et al. |
| 2016/0072723 A1 | 3/2016 | Shanmuganathan et al. |

FOREIGN PATENT DOCUMENTS

| | | |
|---|---|---|
| CN | 101788845 A | 7/2010 |
| CN | 102844724 A | 12/2012 |

OTHER PUBLICATIONS

U.S. Patent and Trademark Office, Office Action issued in related U.S. Appl. No. 14/837,974 dated Apr. 21, 2016.
List of IBM Patents or Patent Applications Treated as Related.
Sandy Irani et al., "Online Strategies for Dynamic Power Management in Systems with Multiple Power-Saving States," ACM Transactions on Embedded Computing Systems, vol. 2, No. 3, Aug. 2003, pp. 325-346.
Qasim Ali, "Host Power Management in VMware vSphere 5," VMware, Inc., 2010.
U.S. Patent and Trademark Office, Final Office Action issued in related U.S. Appl. No. 14/837,974 dated Sep. 22, 2016.
U.S. Patent and Trademark Office, Notice of Allowance issued in related U.S. Appl. No. 14/837,974 dated May 25, 2017.
U.S. Patent and Trademark Office, Office Action issued in related U.S. Appl. No. 14/837,974 dated Jan. 9, 2017.

* cited by examiner

EVENT-DRIVEN REOPTIMIZATION OF LOGICALLY-PARTITIONED ENVIRONMENT FOR POWER MANAGEMENT

FIELD OF THE INVENTION

The invention is generally related to computers and computer software, and in particular, to logically-partitioned computing environments.

BACKGROUND OF THE INVENTION

Computing technology has advanced at a remarkable pace, with each subsequent generation of computing system increasing in performance, functionality, and storage capacity, often at reduced cost. In addition, power management in data centers has become increasingly important in recent years, as evidenced by the emergence of Energy Star compliance and the concept of 'green' computer systems and data centers. Power costs and environmental concerns are important issues in particular for businesses with large data centers. Thus, computer and software manufacturers that build energy efficient systems and solutions may have a distinct advantage in the marketplace.

Power management techniques often involve monitoring workloads and environmental factors and moving workloads between compute resources within a system or pool of systems in such a fashion as to achieve some advantage related to power consumption. This advantage may be gained through powering down (either putting into low power state or shutting completely off) a system or component within a system, or through avoiding hot spots in the data center, or through avoiding high power cost areas or times. The workloads that are shifted are typically either dispatch units when moving workload between processor cores to facilitate processor and memory folding, or applications/jobs when moving workload between systems in a data center.

Many data centers employ logical partitioning, which enables a computer be utilized to run several operating environments, or operating systems, at once. In a typical embodiment, a single logically-partitioned computer or data processing system can run a plurality of operating systems in a corresponding plurality of logical partitions (LPARs), also referred to as virtual machines (VMs). Each operating system resides in its own logical partition, with each logical partition allocated a part of a physical processor, an entire physical processor, or multiple physical processors from the computer. Additionally, a portion of the computer's memory is allocated to each logical partition. An underlying partition manager, often referred to as a hypervisor or virtual machine monitor (VMM), manages and controls the logical partitions. The hypervisor is typically a part of the system firmware and manages the allocation of resources to the operating systems and logical partitions. As such, one logically-partitioned computer may run one or more logical partitions and thus virtualize the underlying hardware resources used by the applications, operating systems, and other program code configured to operate in those logical partitions.

In a large data center, sufficient processing capacity generally exists to enable logical partitions to be placed in such a manner that the overall workload of the data center is located on only a subset of the available hardware resources in the data center, thereby enabling some of the hardware resources to be powered down to reduce overall power consumption. Given the dynamic nature of many workloads, however, the optimal allocation of logical partitions to various hardware resources in a data center may change over time, and in some cases may require administrator action to address sub-optimal logical partition allocations. In some cases, a sub-optimal allocation may not even be readily apparent, resulting in excessive power consumption in the data center and/or reduced performance.

SUMMARY OF THE INVENTION

The invention addresses these and other problems associated with the prior art by providing a method, apparatus and program product that utilize event-driven reoptimization to reallocate one or more logical partitions within a pool of logically-partitioned data processing systems in response to detection of a system event that is likely to increase or decrease the collective resource demands of logical partitions resident in a logically-partitioned computing environment. In some instances, for example, the reoptimization may be used to consolidate logical partitions on fewer processor nodes to improve the potential for powering down hardware resources and thereby reduce power consumption.

Therefore, consistent with one aspect of the invention, power consumption may be managed in a logically-partitioned computing environment including a collection of processor nodes disposed in a pool of logically-partitioned data processing systems. Power consumption may be managed by allocating a plurality of logical partitions to the pool of logically-partitioned data processing systems to optimize power consumption in the logically-partitioned computing environment, after allocating the plurality of logical partitions, autonomously monitoring the pool of logically-partitioned data processing systems for system events that alter resource demands of logical partitions allocated to the pool of logically-partitioned data processing systems, detecting a first system event that alters the resource demands of logical partitions allocated to the pool of logically-partitioned data processing systems based upon monitoring the pool of logically-partitioned data processing systems, and, in response to detecting the first system event, reoptimizing power consumption in the logically-partitioned computing environment by dynamically reallocating at least a subset of the plurality of logical partitions to the collection of processor nodes and dynamically modifying a power state of at least one of the processor nodes in the collection of processor nodes disposed in the pool of logically-partitioned data processing systems.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention utilize event-driven reoptimization to reallocate one or more logical partitions within a pool of logically-partitioned data processing systems in a logically-partitioned computing environment in response to detection of a system event that is likely to increase or decrease the collective resource demands of logical partitions resident in a logically-partitioned computing environment. In some instances, for example, the reoptimization may be used to consolidate logical partitions on fewer processor nodes to improve the potential for powering down hardware resources and thereby reduce power consumption.

A logically-partitioned computing environment, in this regard, may be considered to include one or more data processing systems supporting logical partitioning (or virtualization), with at least some of the data processing systems incorporating a plurality of processor nodes representing hardware resources capable of hosting one or more logical partitions. A logically-partitioned computing environment consistent with the invention generally supports the concept of partition mobility (which may be referred to by names other than partition mobility), whereby a logical partition hosted on one logically-partitioned data processing system may be moved to a different logically-partitioned data processing system during runtime, in some instances with little or no interruption in service.

A processor node, in this regard, may be considered to include any subset of the available hardware resources in a data processing system, and generally, though not necessarily, includes one or more processors, one or more memory devices, and in some instances additional hardware resources such as input/output (I/O) resources, network resources, or other types of resources capable of being allocated to a logical partition. Processor nodes in some embodiments may be implemented as multi-chip modules, circuit boards or cards, books, drawers, racks, slots, chassis, or even combinations thereof. Processor nodes may also be self-contained computer systems in some embodiments. In embodiments where event-driven reoptimization is used to optimize power consumption, processor nodes may also be defined based upon groupings of hardware resources that can be separately powered on, powered off, or otherwise controlled to increase or decrease power consumption. Thus, from the perspective of the herein-described embodiments, a processor node includes at least a collection of processors and memory that may be powered down, or powered completely off, separately from other processor nodes.

In some embodiments of the invention, power consumption may be managed in a logically-partitioned computing environment including a collection of processor nodes disposed in a pool of logically-partitioned data processing systems. Power consumption may be managed by allocating a plurality of logical partitions to the pool of logically-partitioned data processing systems to optimize power consumption in the logically-partitioned computing environment, after allocating the plurality of logical partitions, autonomously monitoring the pool of logically-partitioned data processing systems for system events that alter resource demands of logical partitions allocated to the pool of logically-partitioned data processing systems, detecting a first system event that alters the resource demands of logical partitions allocated to the pool of logically-partitioned data processing systems based upon monitoring the pool of logically-partitioned data processing systems, and, in response to detecting the first system event, reoptimizing power consumption in the logically-partitioned computing environment by dynamically reallocating at least a subset of the plurality of logical partitions to the collection of processor nodes and dynamically modifying a power state of at least one of the processor nodes in the collection of processor nodes disposed in the pool of logically-partitioned data processing systems.

In some embodiments, the collection of processor nodes includes a first processor node disposed in a first logically-partitioned data processing system in the pool of logically-partitioned data processing systems, the first system event reduces resource demands, and reoptimizing power consumption in the logically-partitioned computing environment includes lowering the power state of the first processor node in the collection of processor nodes and moving at least one logical partition previously allocated to the first processor node to one or more different processor nodes in the first logically-partitioned data processing system or a different logically-partitioned data processing system in the pool of logically-partitioned data processing systems. In some embodiments, the first system event is a logical partition power off event, a logical partition hibernation suspend event, an active logical partition migration out of pool event, a dynamic remove processor capacity from a logical partition event or a dynamic remove memory capacity from a logical partition event.

In some embodiments, the collection of processor nodes includes a first processor node disposed in a first logically-partitioned data processing system in the pool of logically-partitioned data processing systems, the first system event increases resource demands, and reoptimizing power consumption in the logically-partitioned computing environment includes increasing the power state of the first processor node and using the capacity gained by increasing the power level of the processor node to meet increased resource demands. In some embodiments, the first system event is a logical partition power on event, a logical partition hibernation resume event, an active logical partition migration into pool event, a dynamic add processor capacity to a logical partition event or a dynamic add memory capacity to a logical partition event.

In some embodiments, a first logically-partitioned data processing system in the pool of logically-partitioned data processing systems includes first and second processor nodes from the collection of processor nodes, and dynamically modifying the power state of at least one of the processor nodes in the collection of processor nodes includes powering down or powering up the first processor node while maintaining a power state of the second processor node. In some embodiments, a first logically-partitioned data processing system in the pool of logically-partitioned data processing systems includes multiple processor nodes from the collection of processor nodes, a second logically-partitioned data processing system in the pool of logically-partitioned data processing systems includes a single processor node from the collection of processor nodes, and dynamically modifying the power state of at least one of the processor nodes in the collection of processor nodes includes powering down or powering up the second logically-partitioned data processing system while maintaining a power state of each of the multiple processor nodes in the first logically-partitioned data processing system.

Numerous variations and modifications will be apparent to one of ordinary skill in the art, as will become apparent from the description below. Therefore, the invention is not limited to the specific implementations discussed herein.

Hardware and Software Environment

Figure 1A:
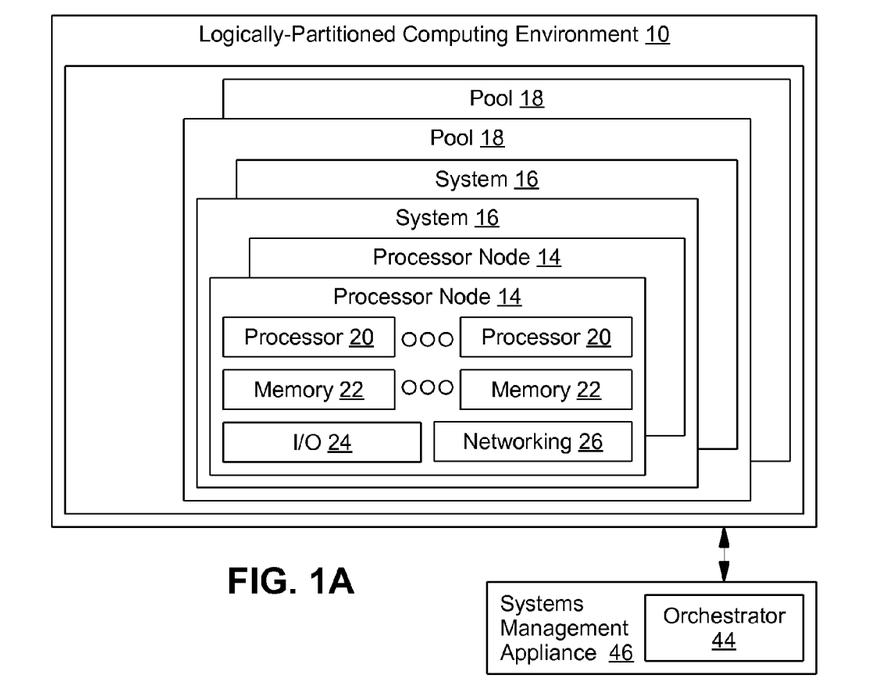
FIGS. 1A and 1B are block diagrams of an example hardware (FIG. 1A) and software (FIG. 1B) environment suitable for implementing a logically-partitioned computing environment consistent with the invention.
Figure 1B:
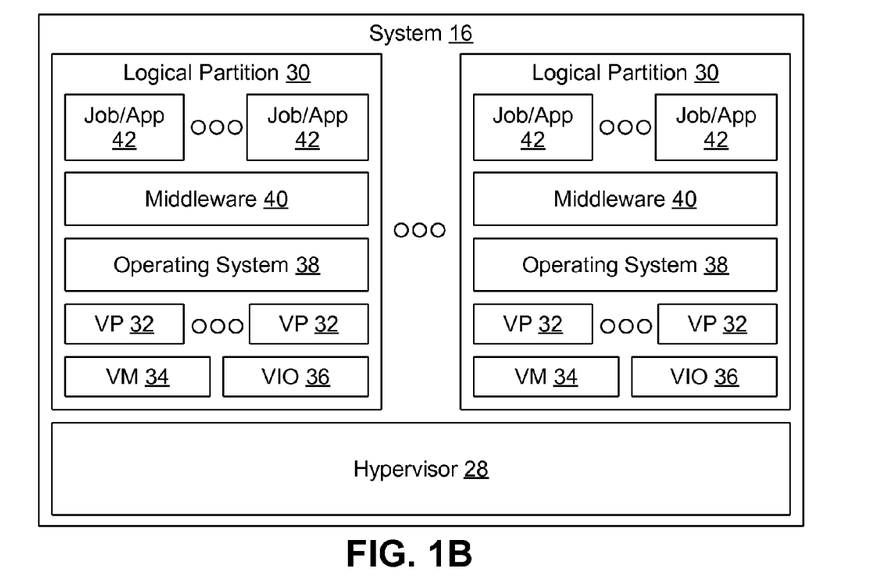

Turning to the Drawings, wherein like parts denote like numbers throughout the several views, FIGS. 1A-1B illustrate the principal hardware and software components in a logically-partitioned computing environment or apparatus 10 consistent with the invention. As shown in FIG. 1A, apparatus 10 may be configured as a multi-node system where the physical hardware is distributed among a plurality of physical processor nodes 14 disposed in a plurality of computer or data processing systems 16, with the data processing systems 16 disposed in one or more pools 18. Each processor node 14 includes one or more processors 20, one or more memory devices 22, and in some embodiments, additional hardware such as input/output (I/O) hardware 24 (e.g., one or more input/output (I/O) adapters) and/or networking hardware 26. Appropriate networking functionality (not shown) may also be used to provide data communication between the various processor nodes 14 and systems 16, as well as other external systems.

Apparatus 10 may be implemented using any of a number of different architectures suitable for implementing a logically-partitioned environment. For example, in one embodiment, apparatus 10 may be implemented as a Power 770, 780 or 795 system available from International Business Machines Corporation, the configuration of which will be apparent to one of ordinary skill in the art having the benefit of the instant disclosure. It will be appreciated, however, that other architectures suitable for executing logically-partitioned environments may be used in other embodiments of the invention, so the invention is not limited to the particular architecture disclosed herein.

Each processor 20 may be implemented as a single or multi-threaded processor and/or as a single or multi-core processor, while each memory 22 may be considered to include one or more levels of memory devices, e.g., a DRAM-based main storage, as well as one or more levels of data, instruction and/or combination caches, with certain caches either serving individual processors or multiple processors as is well known in the art. In addition, the memory of apparatus 10 may be considered to include memory storage physically located elsewhere in apparatus 10, e.g., any cache memory in a processor, as well as any storage capacity used as a virtual memory, e.g., as stored on a mass storage device or on another computer coupled to apparatus 10.

Apparatus 10 operates under the control of one or more kernels, hypervisors, operating systems, etc., and executes or otherwise relies upon various computer software applications, components, programs, objects, modules, data structures, etc., as will be described in greater detail below. Moreover, various applications, components, programs, objects, modules, etc. may also execute on one or more processors in another computer coupled to apparatus 10 via a network, e.g., in a distributed or client-server computing environment, whereby the processing required to implement the functions of a computer program may be allocated to multiple computers over a network.

For example, FIG. 1B illustrates various software components 28-42 that may be resident within a system 16 in apparatus 10. A hypervisor 28 may host one or more logical partitions (LPARs) 30 and may allocate to each logical partition 30 a portion of the physical hardware resources of system 16 (e.g., processor, memory and/or 10 resources associated with one or more processor nodes 14), represented here by one or more virtual processors (VPs) 32, a virtual memory 34 and virtual input/output (VIO) resources 36. Each logical partition 30 may in turn host an operating system 38 and optionally middleware 40, as well as one or more jobs and/or applications 42. It will be appreciated that each logical partition 30, which may also be referred to as a virtual machine or virtual computer, may operate in a manner that emulates a separate physical computer, and as such, may host practically any software components capable of being hosted by a computer.

Additional hardware and/or software components may also be resident in apparatus 10, e.g., mass storage hardware, external input/output devices such as printers or displays, and management hardware and/or software, e.g., a hardware management console (HMC) through which the hardware and/or software configuration of the apparatus may be managed by an administrator. Logically-partitioned environments may be implemented in an innumerable number of manners, and may include an innumerable number of hardware and/or software variations, and as such, the invention is not limited to the particular implementation disclosed herein.

It will be appreciated that the present invention may be a system, a method, and/or a computer program product. The computer program product may include a computer readable storage medium (or media) having computer readable program instructions thereon for causing one or more processors to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawings illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, computer readable program instructions, of which one or more may collectively be referred to herein as "program code," may be identified herein based upon the application within which such instructions are implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the example environment illustrated in FIGS. 1A-1B is not intended to limit the present invention. Indeed, those skilled in the art will recognize that other alternative hardware and/or software environments may be used without departing from the scope of the invention.

Event-Driven Reoptimization of
Logically-Partitioned Environment for Power
Management Power management in the data center has become increasingly important in recent years, as evidenced by the emergence of Energy Star compliance and the concept of 'green' computer systems and data centers. Power costs and environmental concerns are important issues for businesses with large data centers. Thus, computer and software manufacturers that build energy efficient systems and solutions may have a distinct advantage in the marketplace.

Power management techniques conventionally have involved monitoring workloads and environmental factors and moving workloads between compute resources within a system or pool of systems in such a fashion as to achieve some advantage related to power consumption. This advantage may be gained through powering down (either putting into low power state or shutting completely off) a system or component within a system, or through avoiding hot spots in the data center, or through avoiding high power cost areas or times. The workloads that are shifted are typically either dispatch units when moving workload between processor cores to facilitate processor and memory folding, or applications/jobs when moving workload between systems in a data center.

Embodiments consistent with the invention further power management, e.g., within a data center, by utilizing a framework for dynamically placing logical partitions across a single modular system or pool of systems in such a fashion as to optimize the potential for powering savings through partition consolidation and turning off systems in the pool or components of systems in the pool that are not being used. The logical partitions may be moved dynamically based on system events that either free up processing capacity, thereby potentially allowing more hardware resources to be powered down, or increase demand for processing capacity, thereby potentially requiring hardware resources to be powered on.

In the illustrated embodiments, dynamic and autonomous monitoring of system events may be used to detect system events that increase or decrease the entitled processing capacity of the logical partitions running in a pool of systems. In response to such system events, the placement of logical partitions may then be adjusted so as to optimize consolidation in the pool of systems and optimize the potential for powering down hardware resources. In some embodiments, for example, the entitled processing and/or memory capacity of the logical partitions running in a pool of systems may be referred to as the resource demands of the logical partitions. As such, a system event that increases entitled capacity may be considered to increase resource demands of logical partitions running in a pool, while a system event that decreases entitled capacity may be considered to decrease resource demands of logical partitions running in a pool.

One advantage of such an approach over dispatch level workload shifting is that the potential for power savings may generally be greater. Processor folding may allow individual processor cores and chips, and in some cases associated memory, to be put into lower power states, which may in some instances lead to lower system fan speeds as well. The power on latency requirements of a processor folding approach, however, generally prevents resources from being completely powered off. A logical partition-based approach as described herein, however, allows for processing folding as well as for full power off of systems in a pool, or partial power down of systems that incorporate separately powerable processor and memory domains (i.e., processor nodes), such as processor books or processor drawers. A logical partition-based approach as described herein may also not give up entitled capacity, and as such, power on latency requirements may generally be less rigid and deeper power down may generally be possible.

One advantage of such an approach over application/job level workload shifting is that the approach generally avoids OS and application complexity driven by clustering and High Availability (HA) configurations that application/job level shifting generally requires. The herein-described approach may leverage logical partition mobility (LPM) capabilities that may already be used for other purposes such as hardware and/or software maintenance. Extending logical partition mobility to power management as such may therefore not require additional investment in clustering or HA capabilities in some instances.

The herein-described approach may also have an advantage in modular, enterprise class systems such as the aforementioned Power 770, 780, and 795 systems that incorporate multiple nodes (e.g., processor books for Power 795 systems, or CEC drawers for Power 770 and Power 780 systems), each of which may be powered off and on separately from the rest. Node level power management is generally important for enterprise class systems due to the large number of logical partitions they can support and the difficulty that creates finding enough unused capacity elsewhere in the pool to relocate all partitions on the system to other systems so the system can be powered off. The system and capacity modeling and logical partition placement algorithms described herein may therefore support power on/off of entire systems as well as of individual nodes such as utilized in such modular systems, whereas other approaches are generally limited to system level power off/on.

In one embodiment of the invention, for example, event driven reoptimization may be performed on a pool of computer systems, among which logical partitions may be moved in order to free up enough capacity on one or more of the computer systems in the pool to enable either one or more nodes in a multi-node computer system, or an entire computer system, to be powered down, e.g., transitioned to a lower power state. For the purposes of this embodiment, the set or pool of computer systems will be referred to as a power management pool.

Also in this embodiment, the computer systems in the power management pool may be implemented as either or both of enterprise class systems having multiple processor nodes that can be powered up and down individually (e.g., the aforementioned Power 770, 780 and 795 systems), and lower-end systems that do not have multiple, separately powerable processor nodes.

As an example, FIG. 1A illustrates multiple pools 18, where each pool 18 may be considered in some respects a power management pool that includes one or more computer systems 16, each including one or more processor nodes 14. For the purposes of this embodiment, each processor node 14 may be separately powerable, although the invention is not so limited in other embodiments.

To implement event-driven reoptimization, an orchestrator component 44, e.g., running on a systems management appliance 46, may be used in some embodiments. In one embodiment, for example, the orchestrator component may include an energy management utility working in conjunction with a partition placement utility. One suitable implementation, for example, utilizes a Systems Director systems management appliance running an Active Energy Manager energy management utility and a VMControl partition placement utility (all available from International Business Machines Corporation) to implement the functionality of the orchestrator component. It will be appreciated that a systems management appliance may include one or more processors, a memory and other computer components to execute program code implementing the herein-described functionality, and that in some embodiments, additional program code and/or hardware components resident in data processing system 10 may be accessed by a systems management appliance in connection with the herein-described event-driven reoptimization. Furthermore, in some embodiments, the functionality of an orchestrator component may be resident entirely within one or more systems 16 of apparatus 10, e.g., within a logical partition, within a hypervisor, within middleware, within an operating system, within system firmware, within a hardware management console, etc. Therefore, it will be appreciated that the invention is not limited to the particular implementation of event-driven reoptimization principally within a systems management appliance as described hereinafter for the illustrated embodiment.

Systems management appliance 46 in the illustrated embodiment autonomously monitors for system events associated with systems 16 in a power management pool 18 that may change logical partition entitled capacity. In this regard, autonomously monitoring may be considered to be monitoring outside of the direction of an administrator (although enabling and disabling of monitoring may be supported in some embodiments). Systems management appliance 46 also dynamically shifts logical partitions from one system 16 to one or more other systems 16 in an effort to arrange logical partitions in a power optimized fashion so as to reduce utilization of one or more systems 16 enough to power down one or more processor nodes or entire systems. When a processor node is powered down, the hypervisor 28 on host system 16 may relocate any logical partitions 30 running on that processor node to available capacity in other processor nodes 14 on the same system 16. Furthermore, systems management appliance 46 monitors for events that require capacity to be powered back on, and powers on such capacity as necessary. It will be appreciated that in other embodiments, a systems management appliance may be capable of directly managing the placement of logical partitions on processor nodes.

Figure 2:
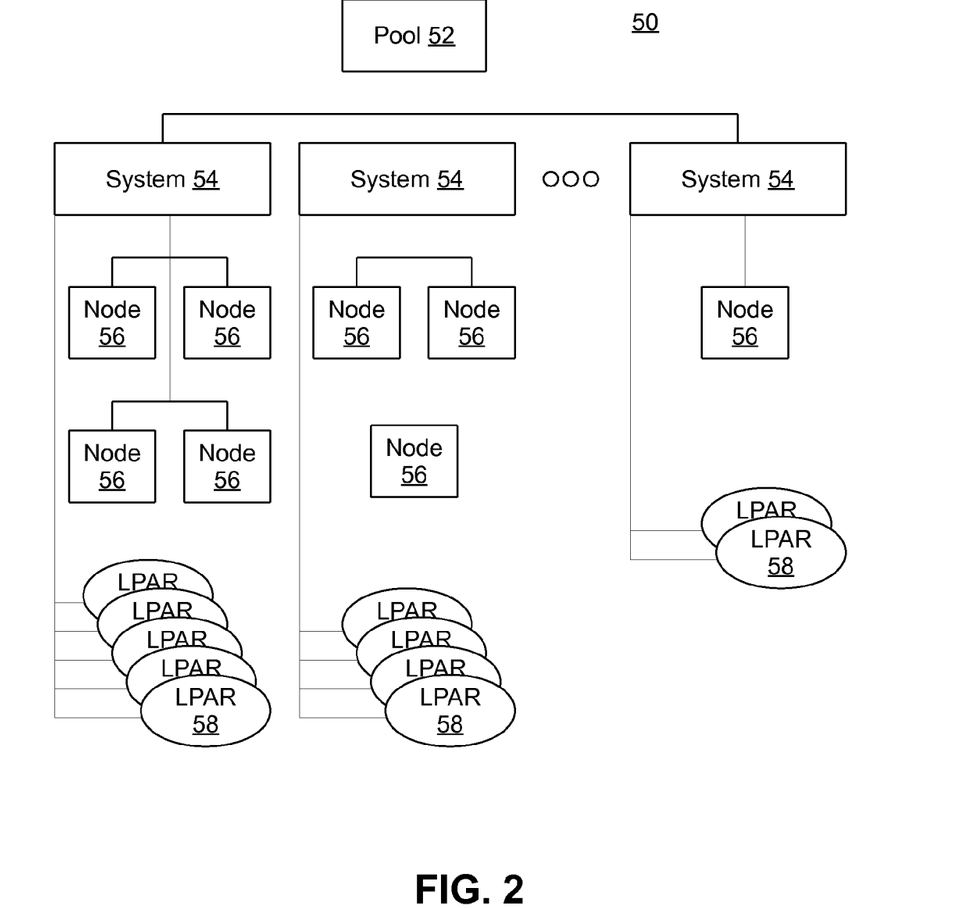
FIG. 2 is a block diagram of a model used to perform event-driven reoptimization in one embodiment consistent with the invention.

FIG. 2 next illustrates an example data model 50 of a power management pool 52, systems 54, nodes 56 and logical partitions (LPARs) 58 for use in one embodiment of the invention, showing that pool 52 may include one or more systems 54, and each system 54 may include one or more processor nodes 56 and may have one or more LPARs 58 allocated thereto at a particular time. Model 50 may be used, for example, by an orchestrator and/or systems management appliance to perform event-driven reoptimization in a manner consistent with the invention.

Tables I-IV below provide example attributes for each of the pool 52, system 54, node 56 and LPAR 58 that may be defined in model 50:

TABLE I

Pool Attributes

| Attribute | Description |
| --- | --- |
| numSystems | Number of systems |
| systemArray | Array of system identifiers |

TABLE II

System Attributes

| Attribute | Description |
| --- | --- |
| numNodes | Number of processor nodes in the system |
| nodeArray | Array of node identifiers |
| numLps | Number of partitions configured on the system |
| partitionArray | Array of partition identifiers |
| installedProc | Total processing capacity installed in system |
| installedMem | Total memory capacity installed in system |
| activeProc | Total powered on (active) processing capacity in system |
| activeMem | Total powered on (active) memory capacity in system |
| entitledProc | Total entitled processing capacity in system (guaranteed to active partitions) |
| entitledMem | Total entitled memory capacity in system (guaranteed to active partitions) |

TABLE II-continued

System Attributes

| Attribute | Description |
| --- | --- |
| utilizationLimitProc | Fraction of active processor capacity that entitledProc should not exceed (e.g., .95) |
| utilizationLimitMem | Fraction of active memory capacity that entitledMem should not exceed (e.g., .95) |
| poweredOn | True = system powered on (active); False = system powered off (inactive) |

TABLE III

Node Attributes

| Attribute | Description |
| --- | --- |
| installedProc | Total processing capacity installed in node |
| installedMem | Total memory capacity installed in node |
| poweredOn | True = node powered up (active); False = node powered down (inactive) |
| powerRating | Numerical value that represents relative power requirements of node |

TABLE IV

Partition Attributes

| Attribute | Description |
| --- | --- |
| entitledProc | Processing capacity that partition is entitled to (guaranteed) |
| entitledMem | Memory capacity that partition is entitled to (guaranteed) |
| desiredProc | Processing capacity that partition must have to boot |
| desiredMem | Memory capacity that partition must have to boot |
| poweredOn | True = partition powered up (active); False = partition powered down (inactive) |

In the illustrated embodiment, the following system events may be autonomously monitored and signaled from a systems management appliance to an orchestrator component for the purposes of initiating a reoptimization of logical partitions and power consumption in a power management pool:

logical partition power off (*)
logical partition power on
logical partition hibernation suspend (*)
logical partition hibernation resume
active logical partition migration out of pool (*)
active logical partition migration into pool
dynamic processor remove (DLPAR) (*)
dynamic processor add (DLPAR)
dynamic memory remove (DLPAR) (*)
dynamic memory add (DLPAR)

The events designated by (*) above may be referred to as entitled capacity decrease system events that generally cause processor and/or memory capacity to free up due to a reduction in partition entitled capacity, potentially allowing consolidation of partitions and power down (e.g., deactivation) of processor nodes and/or systems. In the illustrated embodiment, these entitled capacity decrease system events may be signaled to the orchestrator component after they occur. It will be appreciated that dynamic processor/memory remove events dynamically remove processor/memory capacity from a running logical partition.

The events not designated by (*) above may be referred to as entitled capacity increase system events that generally cause additional processor and/or memory capacity to be consumed due to increase in partition entitled capacity. If processor nodes and/or systems are powered down as a power savings measure, it may be desirable or necessary to power some or all of them back on (activation) in order to meet the requirements for additional processor and/or memory capacity. In general, in the illustrated embodiment, these entitled capacity increase system events may be signaled to the orchestrator component before they occur. It will be appreciated that dynamic processor/memory add events dynamically add processor/memory capacity to a running logical partition.

In the embodiments discussed herein, in response to an entitled capacity decrease or entitled capacity increase system event, a power state of at least one node and/or system may be altered. Altering the power state generally may include increasing or decreasing the power state. Increasing the power state may include, for example, powering on a node and/or system from an off state, switching from a lower power mode to a higher power mode, or any other alteration that increases the power consumption of the node or system, generally coincidental with increasing the processing capacity of the node or system. Conversely, decreasing the power state may include, for example, powering off a node and/or system from an on state, switching from a higher power mode to a lower power mode, or any other alteration that decreases the power consumption of the node or system, generally coincidental with decreasing the processing capacity of the node or system.

In addition, in response to an entitled capacity decrease or entitled capacity increase system event, and generally in association with altering the power state of a node or system, one or more logical partitions may be moved between nodes and/or systems to effectively reoptimize (e.g., from the perspective of power management) the allocation of logical partitions among the nodes and/or systems in the power management pool. It will be appreciated that any optimization of logical partition allocation in a pool in response to a system event may be considered to be a reoptimization of a prior optimization of logical partition allocation. It will also be appreciated that in some embodiments, an optimization of logical partition allocation in the manner discussed herein may be performed manually or automatically, but not specifically in response to one of the aforementioned system events, e.g., after initial system setup or at another time deemed useful by an administrator.

Figure 3A:
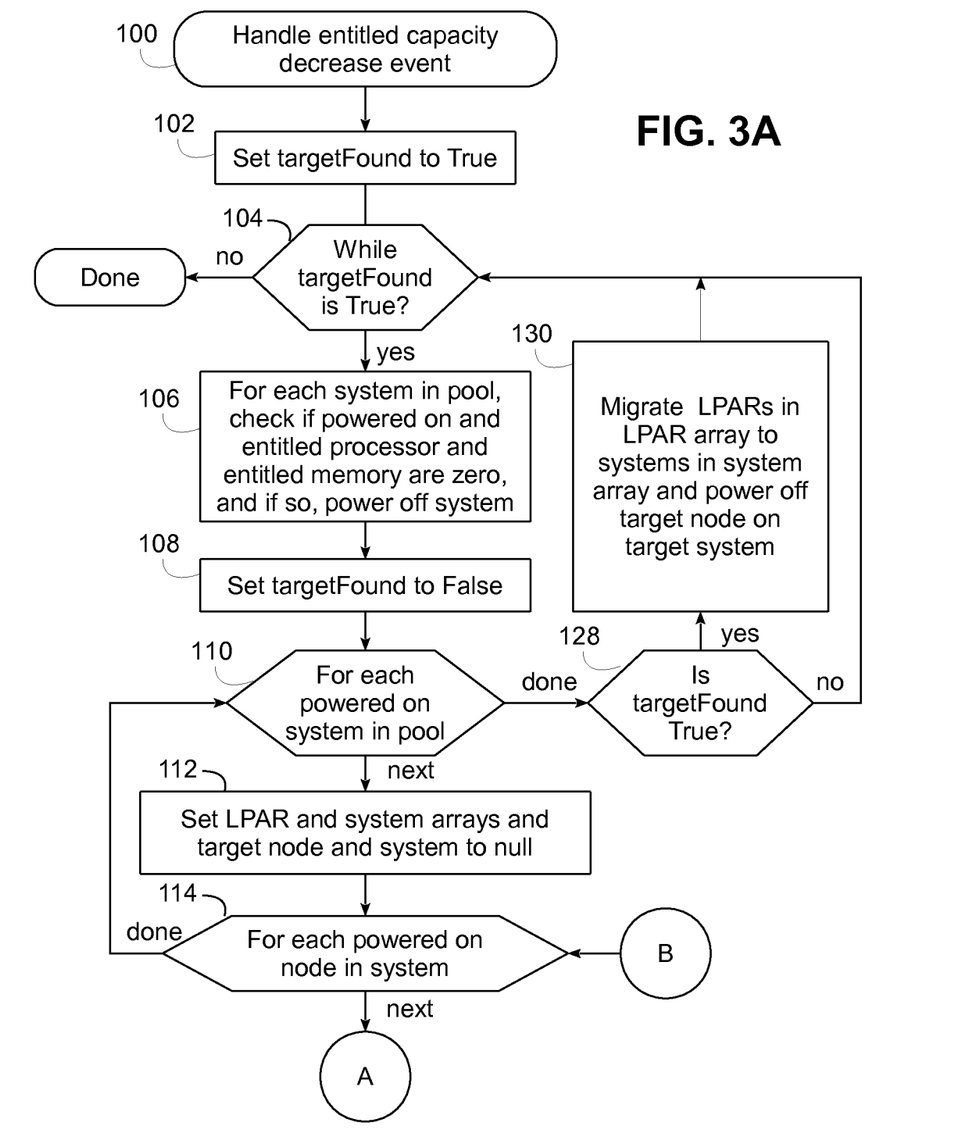
FIGS. 3A-3B show a flowchart illustrating an example reoptimization routine that may be performed by the orchestrator component of FIG. 1A to reoptimize power consumption by a logically partitioned computing environment in response to an entitled capacity decrease system event.
Figure 3B:
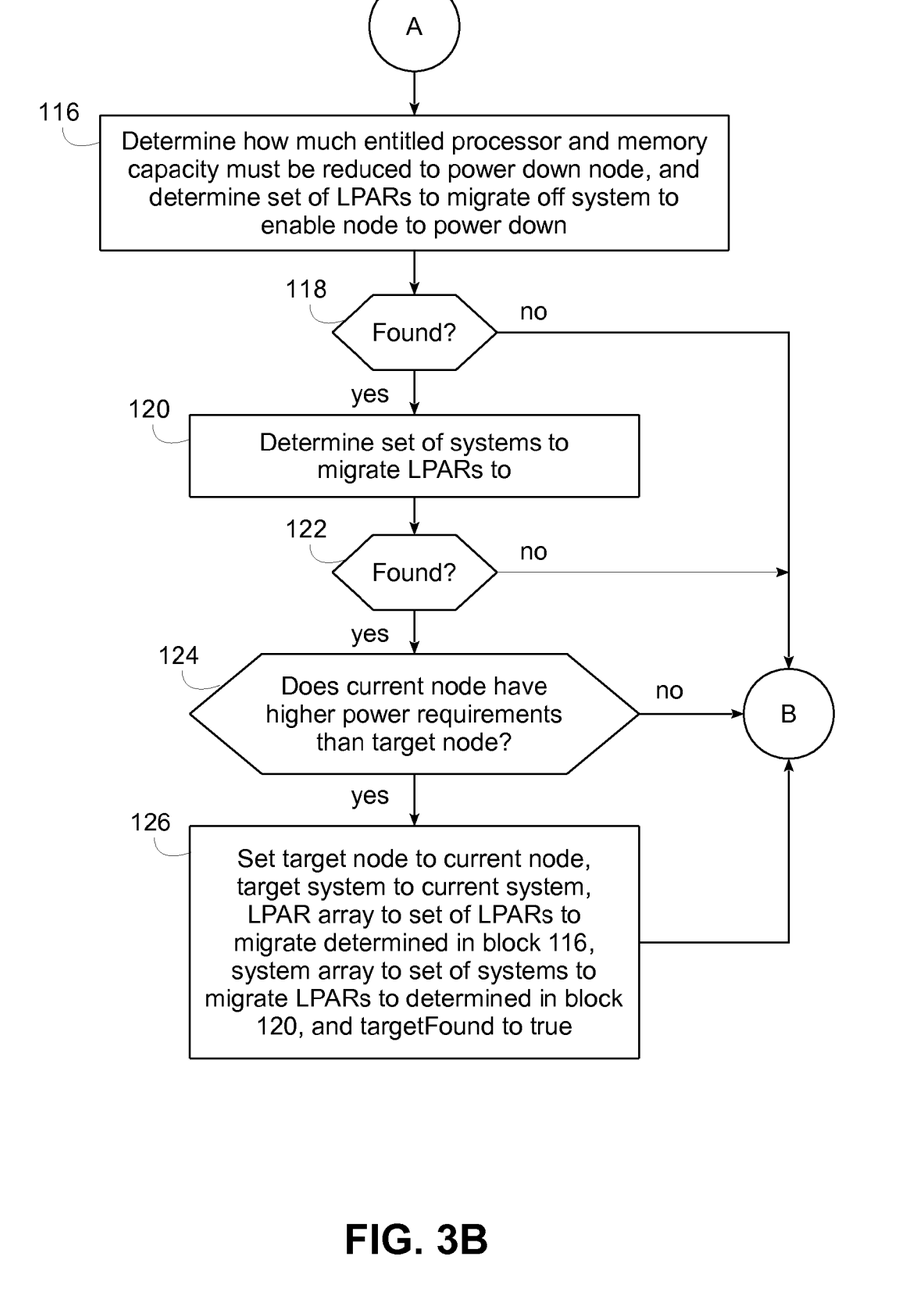

FIGS. 3A-3B illustrate an example reoptimization routine 100 reflecting the processing that may occur in the orchestrator component when an entitled capacity decrease system event is signaled, and as noted above, generally after the operations associated with the event (e.g., a partition power off, partition hibernation suspend, active partition migration out of pool, dynamic processor remove or dynamic memory remove operation) have been performed. In some embodiments, routine 100 may also be initiated manually by an administrator to optimize partition placement and possibly power down processor nodes and/or systems.

Routine 100 may receive as input the aforementioned model for the power management pool, and starts at block 102 by setting a targetFound flag to true. Block 104 initiates a WHILE loop that executes until targetFound is false. Block 104 passes control to block 106 to determine whether any system in the pool meets the criteria to be powered off, e.g., by determining, for each system in the pool, if that system is powered on and the entitled processor and memory capacity for that system (entitledProc and entitledMem) are both zero. If so, the system may be powered off.

Next, in block 108, targetFound is set to false, and block 110 initiates a FOR loop to process each powered on system in the pool (powered off systems may be skipped in some embodiments). For each such system, block 112 initializes each of an LPAR array, a system array, a target node variable and a target system variable to null, and block 114 initiates a FOR loop to process each powered on node in the system (powered off nodes may be skipped in some embodiments).

Referring to FIG. 3B, for each powered on node in the current system, block 116 determines how much entitled processor and memory capacity must be reduced to power down the current node, and determines a set of partitions (LPARs) to migrate off the current system to enable the current node to power down. In one embodiment, for example, the entitled processor and memory capacity that must be reduced to power down the current node (N) on the current system (S) may be calculated as follows:

requiredReductionInEntitledCapProc=$N$.installedProc−(($S$.activeProc*$S$.utilizationLimitProc)−$S$.entitledProc)

requiredReductionInEntitledCapMem=$N$.installedMem−(($S$.activeMem*$S$.utilizationLimitMem)−$S$.entitledMem)

In addition, in some embodiments each of these values may be set to zero if the calculated result is less than zero.

In one embodiment, to determine the set of partitions to migrate off the current system, a search may be performed to determine a set of partitions the sum of whose entitled capacities is closest to but still greater than or equal to the required reduction. The inputs to such a determination may include the system for which the set of partitions to move is to be calculated, the required reduction in entitled processor capacity and the required reduction in entitled memory capacity, with the output being an array of one or more logical partitions to migrate off of the current system.

Next, block 118 determines whether any suitable logical partitions were found, and if so, block 120 determines a set of destination systems to migrate the logical partitions to. In one embodiment, for example, the determination may receive as an input an LPAR array and may search for other systems in the pool having sufficient excess entitled capacity to receive the migrating logical partitions, and may then output the findings as a set of destination systems. In one embodiment, one destination system may be selected for each logical partition in the LPAR array, although in some embodiments multiple logical partitions may be moved to particular systems. A determination of whether a potential destination system may have sufficient capacity may be based upon the installedProc, installedMem, activeProc, activeMem, entitledProc, entitledMem, utilizationLimitProc, and/or utilizationLimitMem attributes for the system, e.g., favoring systems with sufficient excess active capacities over systems with sufficient excess installed capacities, and keeping in mind utilization limits set for the system.

Next, block 122 determines whether any suitable set of destination systems was found, and if so, passes control to block 124 to determine if the current node is a "better" choice to power down than any previously-identified node stored in the target node variable. A check may also be made to determine if no other node has yet been stored in the target node variable, whereby the current node would be identified by the target node variable. In this regard, in one embodiment, a better choice may be indicated when the current node has higher power requirements (powerRating) than the node identified by the target node variable, as potentially greater power savings may be obtained by powering off the current node instead of the target node. In other embodiments, other criteria may be used to determine whether one node is a better choice than another, e.g., based on expected power down time or a combination of factors.

If the current node is considered a better choice, block 124 passes control to block 126 to set the target node variable to identify the current node, set the target system variable to identify the current system, set the LPAR array to the set of LPARs determined in block 116, set the system array to the set of systems identified in block 120, and set targetFound to True to indicate that a suitable node has been found to power down. Upon completion of block 126, or in response to a negative determination in any of blocks 118, 122 or 124, control returns to block 114 (FIG. 3A) to continue cycling through the nodes in the current system. Once all nodes in the current system are processed, block 114 returns control to block 110 to continue cycling through the other systems in the pool.

Once all systems have been processed, block 110 passes control to block 128 to determine whether targetFound has been set to True. If so, control passes to block 130 to migrate the logical partitions in the LPAR array to the systems in the system array, and power off the node identified by the target node and target system variables. Upon completion of block 130, or if targetFound is determined to be False in block 128, control returns to block 104 to perform another iteration if the last iteration identified a suitable target node to power down (targetFound is True). Once no further power down opportunities are identified block 104 terminates routine 100.

FIGS. 4A-4D next illustrate an example reoptimization routine 150 reflecting the processing that may occur in the orchestrator component when an entitled capacity increase system event is signaled. In some embodiments, routine 150 may also be initiated manually by an administrator.

Figure 4A:
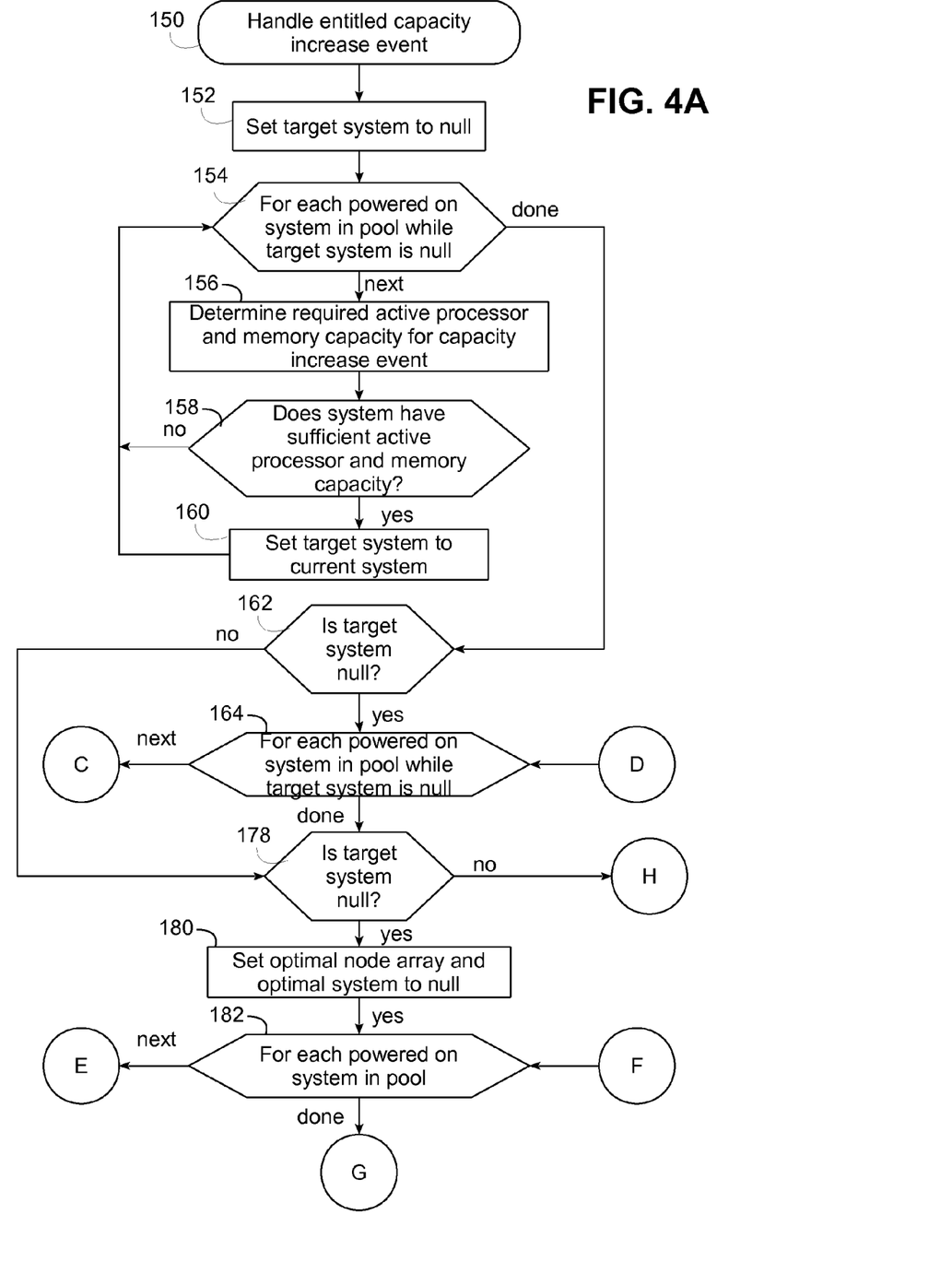
FIGS. 4A-4D show a flowchart illustrating an example reoptimization routine that may be performed by the orchestrator component of FIG. 1A to reoptimize power consumption by a logically partitioned computing environment in response to an entitled capacity increase system event.

Routine 150 may generally be called before the operations associated with the event (e.g., a partition power on, partition hibernation resume, active partition migration into pool, dynamic processor add or dynamic memory add operation) have been performed. Routine 150 may receive as input the model of the power management pool and the processor and memory capacity needed to handle the increase event. In some embodiments, rather than the processor and memory capacity need, an identification of a partition to be powered on/resumed/migrated may be provided, such that the processor and memory capacity needed may be obtained from the model.

Routine 150 begins in block 152 by setting a target system variable to null. This variable will be returned as a result of the routine to indicate the system upon which the requested capacity may be used. Next, block 154 initiates a FOR loop to determine if the requested capacity can be met from resources already powered on, and without moving partitions. For each powered on system in the pool, and while the target system variable is null, block 156 determines required active processor and memory capacity. For example, in one embodiment, the required capacities may be determined for a current system (S) as follows:

requiredActiveProc=(S.entitledProc+requestedProc-Capacity)/S.utilizationLimitProc requiredActiveMem=(S.entitledMem+requestedMem-Capacity)/S.utilizationLimitMem Block 158 next determines if the current system (S) has sufficient active processor and memory capacity (e.g., where S.activeProc>=requiredActiveProc and S.activeMem>=requiredActiveMem). If so, the target system is set to the current system, and control returns to block 154, whereby, since the target system is no longer null, block 154 passes control to block 162. Similarly, if block 158 determines the current system does not have sufficient active capacity, block 158 passes control to block 154 to process additional powered on systems in the pool.

Block 162 next determines whether the target system variable is still null (thus, the requested capacity has not yet been handled), and if so, passes control to block 164 to initiate another FOR loop to process each powered on system in the pool to determine if the requested capacity can be handled from resources already powered on, by moving one or more logical partitions. For each powered on system, block 164 passes control to block 166 (FIG. 4B) to set LPAR and system arrays initially to null.

Figure 4B:
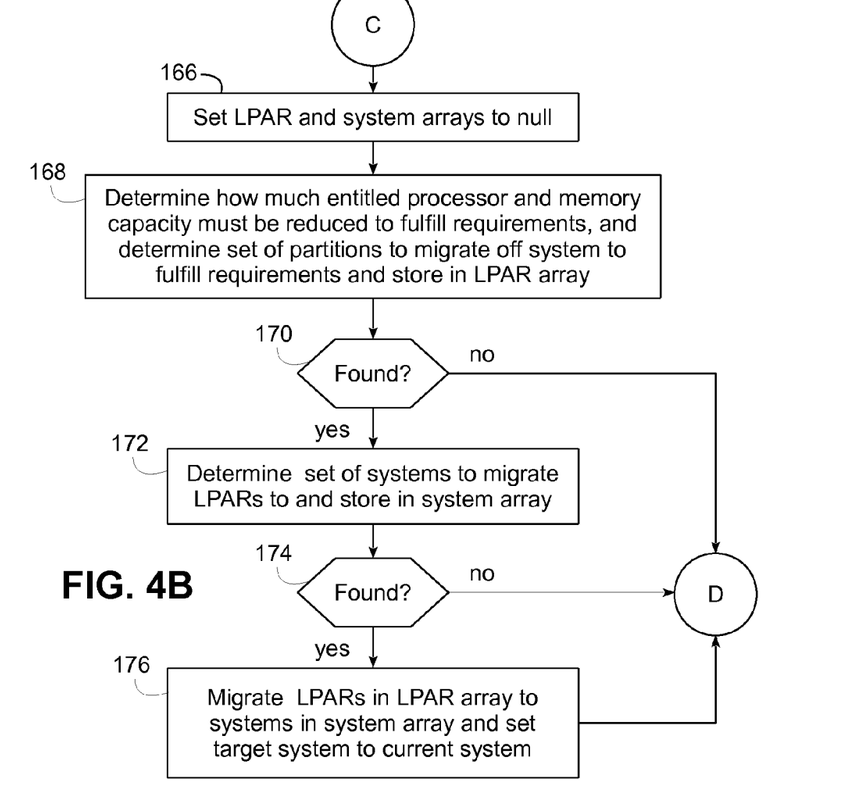

Next, block 168 determines how much entitled processor and memory capacity must be reduced on the current system to accommodate the requested capacity, and determines a set of partitions to migrate off the current system to achieve the required capacity reductions. The determined set of partitions are then stored in the LPAR array. In one embodiment, for example, the entitled processor and memory capacity that must be reduced may be calculated using requestedProcCapacity and requestedMemCapacity as follows:

requiredReductionInEntitledCapProc=requestedProcCapacity−((S.activeProc*S.utilizationLimitProc)−S.entitledProc)

requiredReductionInEntitledCapMem=requestedMemCapacity−((S.activeMem*S.utilizationLimitMem)−S.entitledMem)

In one embodiment, to determine the set of partitions to migrate off the current system, a search may be performed to determine a set of partitions the sum of whose entitled capacities is closest to but still greater than or equal to the required capacity reductions. The inputs to such a determination may include the system for which the set of partitions to move is to be calculated, the required reduction in entitled processor capacity and the required reduction in entitled memory capacity, with the output being an array of one or more logical partitions to migrate off of the current system.

Next, block 170 determines whether any suitable logical partitions were found (i.e., the LPAR array is not null), and if so, block 172 determines a set of destination systems to migrate the logical partitions in the LPAR array to, with the results stored in the system array. In one embodiment, for example, the determination may be performed in a similar manner to that discussed above for block 120 of FIG. 3B.

Next, block 174 determines whether any suitable set of destination systems was found (i.e., the system array is not null), and if so, passes control to block 176 to migrate the partitions in the LPAR array to the systems in the system array and set the target system to the current system.

Upon completion of block 176, or in response to a negative determination in either of blocks 170 or 174, control returns to block 164 (FIG. 3A) to continue cycling through the systems in the pool. Once all systems are processed, block 164 passes control to block 178 to determine whether the target system variable is still null (thus, the requested capacity has not yet been handled).

If so, control passes to block 180 to attempt to see if the requested capacity can be handled by powering on a node on a powered on system in the pool. Specifically, block 180 sets an optimal node array and an optimal system variable to null. The optimal node array stores one or more nodes determined to be suitable for powering on in order to handle the requested capacity. The optimal system variable indicates the system within which the nodes in the optimal node array reside.

Figure 4C:
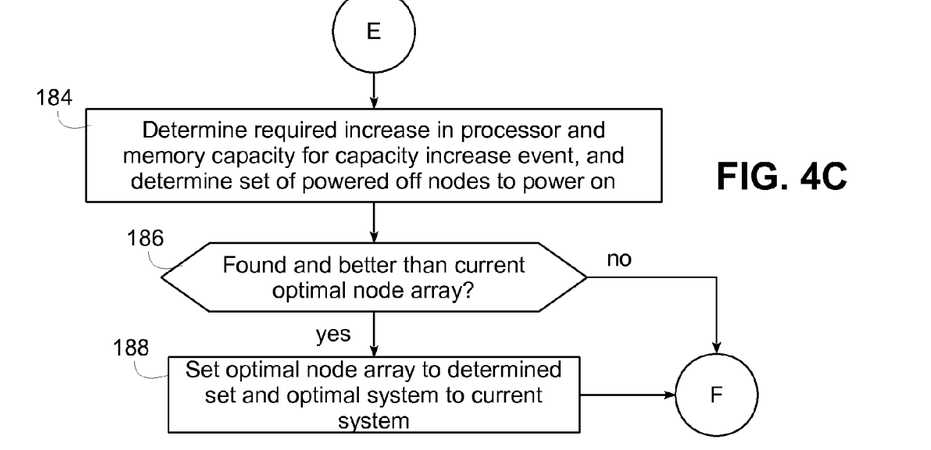

Block 182 next initiates a FOR loop to process each powered on system in the pool. For each such system, block 182 passes control to block 184 (FIG. 4C) to determine the required increase in active processor and memory capacity, and determine set of powered off nodes to power on to handle the required increase. In one embodiment, for example, the following values may be calculated to determine the required increase in active processor and memory capacity for a system (S):

requiredActiveProc=(*S*.entitledProc+requestedProcCapacity)/*S*.utilizationLimitProc;

requiredIncreaseInActiveCapacityProc=requiredActiveProc−*S*.activeProc;

requiredActiveMem=(*S*.entitledMem+requestedMemCapacity)/*S*.utilizationLimitMem;

requiredIncreaseInActiveCapacityMem=requiredActiveMem−*S*.activeMem;

Determining the set of powered off nodes to power on may take into account node power ratings such that the selected set uses a minimum amount of power among all eligible sets.

Next, block 186 determines whether a set of powered off nodes to power on has been found, and if so, whether that set is "better" than the set stored in the current optimal node array (if any). For example, a comparison may be made between the aggregate power ratings of the determined set and the optimal node array, and if the determined set has a lower aggregate power rating, control passes to block 188 to set the optimal node array to the determined set and set the optimal system to the current system within which the determined set of nodes resides.

Upon completion of block 188, or if block 186 determines that the optimal node array is still optimal, control returns to block 182 (FIG. 4A) to process the remaining powered on systems in the pool. Once all systems have been processed, block 182 then passes control to block 190 (FIG. 4D) to determine whether a set of optimal nodes have been found (i.e., the optimal node array is not null). If so, control passes to block 192 to power on each node in the optimal node array and set the target system to the determined optimal system.

Figure 4D:
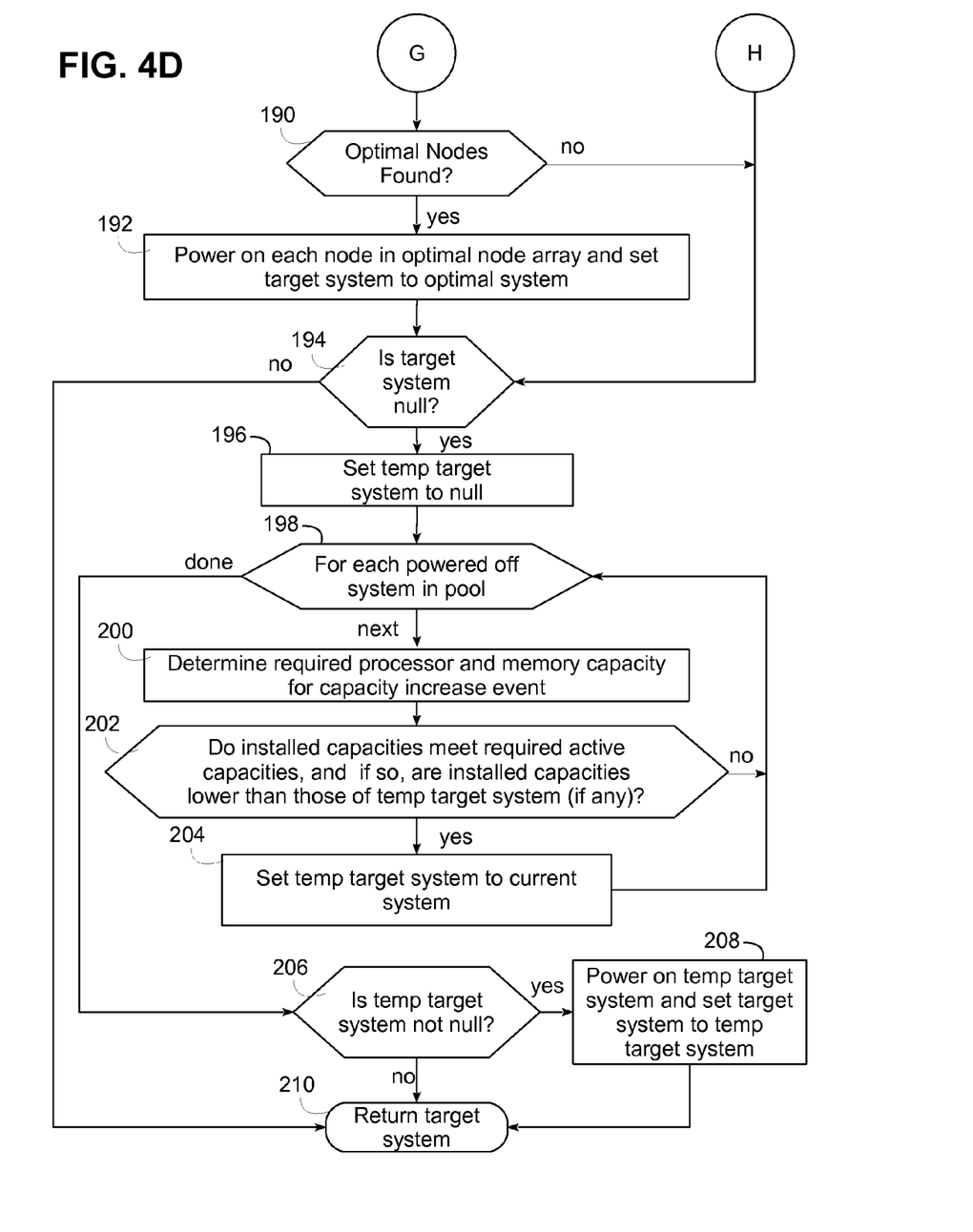

Upon completion of block 192, or if no optimal nodes were found in block 190, control passes to block 194 to again determine whether the target system variable is still null (thus, the requested capacity has not yet been handled). If so, control then passes to block 196 to initiate a process to determine if the requested capacity can be handled by powering on an entire system. Specifically, block 196 sets a temp target system variable to null, and block 198 initiates a FOR loop to process each powered off system in the pool. For each such system, block 200 determines required active capacities for the system, e.g., by dividing the requested capacities by the utilization limits for the system (e.g., utilizationLimitProc and utilizationLimitMem).

Block 202 then determines whether the installed capacities for the system (e.g., installedProc and installedMem) meet (e.g., are greater than or equal to) the required active capacities. If so, block 202 also determines whether the installed capacities of the current system are lower than those of the system identified by the temp target system variable (if any). If so, control passes to block 204 to set the temp target system variable to the current system. Upon completion of block 204, or if block 202 does not determine that the current system is appropriate, control returns to block 198 to process any remaining powered off systems in the pool.

Once all powered off systems are processed, block 198 passes control to block 206 to determine if the temp target system variable is not null (i.e., identifies a system suitable for powering on). If so, control passes to block 208 to power on the system identified by the temp target system variable and set the target system variable to the powered on system. Control then passes to block 210 to return the target system variable and terminate the routine.

If block 206 determines that the temp target system variable is null, block 208 is bypassed and control proceeds to block 210 to terminate the routine. In addition, it will also be appreciated that each of blocks 162, 178 and 194 will effectively pass control to block 210 as soon as the target system variable is set to a non-null value, thereby indicating that the requested capacity has been handled.

Various modifications may be made to the illustrated embodiments consistent with the invention. Therefore, the invention lies in the claims hereinafter appended.

What is claimed is:

1. An apparatus, comprising:
   at least one processor; and
   program code configured upon execution by the at least one processor to manage power consumption in a logically-partitioned computing environment including a collection of processor nodes disposed in a pool of logically-partitioned data processing systems, wherein each processor node includes one or more processors and one or more memory devices capable of hosting one or more logical partitions, the program code configured to:
   allocate a plurality of logical partitions to the pool of logically-partitioned data processing systems to optimize power consumption in the logically-partitioned computing environment;
   after allocating the plurality of logical partitions, autonomously monitor the pool of logically-partitioned data processing systems for system events signaled in response to operations that alter resource demands of logical partitions allocated to the pool of logically-partitioned data processing systems;
   detect a first system event that alters the resource demands of logical partitions allocated to the pool of logically-partitioned data processing systems based upon monitoring the pool of logically-partitioned data processing systems; and
   in response to detecting the first system event signaled by a system management appliance, notify an orchestrator component to reoptimize power consumption in the logically-partitioned computing environment by dynamically reallocating at least a subset of the plurality of logical partitions to the collection of processor nodes and dynamically modifying a power state of at least one of the processor nodes in the collection of processor nodes disposed in the pool of logically-partitioned data processing systems, wherein the program code is configured to dynamically reallocate at least a subset of the plurality of logical partitions to the collection of processor nodes by moving at least one logical partition between processor nodes among the collection of processor nodes.

2. The apparatus of claim 1, wherein the collection of processor nodes includes a first processor node disposed in a first logically-partitioned data processing system in the pool of logically-partitioned data processing systems, wherein the first system event reduces resource demands, and wherein the program code is configured to reoptimize power consumption in the logically-partitioned computing environment by lowering the power state of the first processor node in the collection of processor nodes and moving at least one logical partition previously allocated to the first processor node to one or more different processor nodes in the first logically-partitioned data processing system or a different logically-partitioned data processing system in the pool of logically-partitioned data processing systems.

3. The apparatus of claim 2, wherein the first system event is a logical partition power off event.

4. The apparatus of claim 2, wherein the first system event is a logical partition hibernation suspend event.

5. The apparatus of claim 2, wherein the first system event is an active logical partition migration out of pool event.

6. The apparatus of claim 2, wherein the first system event is a dynamic remove processor capacity from a logical partition event or a dynamic remove memory capacity from a logical partition event.

7. The apparatus of claim 1, wherein the collection of processor nodes includes a first processor node disposed in a first logically-partitioned data processing system in the pool of logically-partitioned data processing systems, wherein the first system event increases resource demands, and wherein the program code is configured to reoptimize power consumption in the logically-partitioned computing environment by increasing the power state of the first processor node and using the capacity gained by increasing the power level of the processor node to meet increased resource demands.

8. The apparatus of claim 7, wherein the first system event is a logical partition power on event.

9. The apparatus of claim 7, wherein the first system event is a logical partition hibernation resume event.

10. The apparatus of claim 7, wherein the first system event is an active logical partition migration into pool event.

11. The apparatus of claim 7, wherein the first system event is a dynamic add processor capacity to a logical partition event or a dynamic add memory capacity to a logical partition event.

12. The apparatus of claim 1, wherein a first logically-partitioned data processing system in the pool of logically-partitioned data processing systems includes first and second processor nodes from the collection of processor nodes, and wherein the program code is configured to dynamically modify the power state of at least one of the processor nodes in the collection of processor nodes by powering down or powering up the first processor node while maintaining a power state of the second processor node.

13. The apparatus of claim 1, wherein a first logically-partitioned data processing system in the pool of logically-partitioned data processing systems includes multiple processor nodes from the collection of processor nodes, wherein a second logically-partitioned data processing system in the pool of logically-partitioned data processing systems includes a single processor node from the collection of processor nodes, and wherein the program code is configured to dynamically modify the power state of at least one of the processor nodes in the collection of processor nodes by powering down or powering up the second logically-partitioned data processing system while maintaining a power state of each of the multiple processor nodes in the first logically-partitioned data processing system.

14. A program product, comprising:
a non-transitory computer readable medium; and
program code stored on the non-transitory computer readable medium and configured upon execution by at least one processor to manage power consumption in a logically-partitioned computing environment including a collection of processor nodes disposed in a pool of logically-partitioned data processing systems, wherein each processor node includes one or more processors and one or more memory devices capable of hosting one or more logical partitions, the program code configured to:
allocate a plurality of logical partitions to the pool of logically-partitioned data processing systems to optimize power consumption in the logically-partitioned computing environment;
after allocating the plurality of logical partitions, autonomously monitor the pool of logically-partitioned data processing systems for system events signaled in response to operations that alter resource demands of logical partitions allocated to the pool of logically-partitioned data processing systems;
detect a first system event that alters the resource demands of logical partitions allocated to the pool of logically-partitioned data processing systems based upon monitoring the pool of logically-partitioned data processing systems; and
in response to detecting the first system event signaled by a system management appliance, notify an orchestrator component to reoptimize power consumption in the logically-partitioned computing environment by dynamically reallocating at least a subset of the plurality of logical partitions to the collection of processor nodes and dynamically modifying a power state of at least one of the processor nodes in the collection of processor nodes disposed in the pool of logically-partitioned data processing systems, wherein the program code is configured to dynamically reallocate at least a subset of the plurality of logical partitions to the collection of processor nodes by moving at least one logical partition between processor nodes among the collection of processor nodes.

15. The program product of claim 14, wherein the collection of processor nodes includes a first processor node disposed in a first logically-partitioned data processing system in the pool of logically-partitioned data processing systems, wherein the first system event reduces resource demands, and wherein the program code is configured to reoptimize power consumption in the logically-partitioned computing environment by lowering the power state of the first processor node in the collection of processor nodes and moving at least one logical partition previously allocated to the first processor node to one or more different processor nodes in the first logically-partitioned data processing system or a different logically-partitioned data processing system in the pool of logically-partitioned data processing systems.

16. The program product of claim 14, wherein the collection of processor nodes includes a first processor node disposed in a first logically-partitioned data processing system in the pool of logically-partitioned data processing systems, wherein the first system event increases resource demands, and wherein the program code is configured to reoptimize power consumption in the logically-partitioned computing environment by increasing the power state of the first processor node and using the capacity gained by increasing the power level of the processor node to meet increased resource demands.

17. The program product of claim 14, wherein a first logically-partitioned data processing system in the pool of logically-partitioned data processing systems includes first and second processor nodes from the collection of processor nodes, and wherein the program code is configured to dynamically modify the power state of at least one of the processor nodes in the collection of processor nodes by powering down or powering up the first processor node while maintaining a power state of the second processor node.

18. The program product of claim 14, wherein a first logically-partitioned data processing system in the pool of logically-partitioned data processing systems includes multiple processor nodes from the collection of processor nodes, wherein a second logically-partitioned data processing system in the pool of logically-partitioned data processing systems includes a single processor node from the collection of processor nodes, and wherein the program code is configured to dynamically modify the power state of at least one of the processor nodes in the collection of processor nodes by powering down or powering up the second logically-partitioned data processing system while maintaining a power state of each of the multiple processor nodes in the first logically-partitioned data processing system.

19. The program product of claim 14, wherein the first system event is a logical partition power off event, a logical partition hibernation suspend event, an active logical partition migration out of pool event, a dynamic remove processor capacity from a logical partition event a dynamic remove memory capacity from a logical partition event, a logical partition power on event, a logical partition hibernation resume event, an active logical partition migration into pool event, a dynamic add processor capacity to a logical partition event or a dynamic add memory capacity to a logical partition event.

\* \* \* \* \*